United States Patent
Chen et al.

(10) Patent No.: US 10,364,363 B2
(45) Date of Patent: Jul. 30, 2019

(54) RADIATION CURABLE BINDER DISPERSION

(71) Applicant: Hewlett-Packard Development Company, L.P., Houston, TX (US)

(72) Inventors: Tienteh Chen, San Diego, CA (US); Bin Huang, San Diego, CA (US); George Sarkisian, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 111 days.

(21) Appl. No.: 15/544,794

(22) PCT Filed: Jan. 30, 2015

(86) PCT No.: PCT/US2015/013682
§ 371 (c)(1),
(2) Date: Jul. 19, 2017

(87) PCT Pub. No.: WO2016/122563
PCT Pub. Date: Aug. 4, 2016

(65) Prior Publication Data
US 2018/0016453 A1  Jan. 18, 2018

(51) Int. Cl.
| | | |
|---|---|---|
| *C08G 18/00* | (2006.01) | |
| *C08G 61/04* | (2006.01) | |
| *C09D 11/101* | (2014.01) | |
| *C09D 11/30* | (2014.01) | |
| *C09D 11/102* | (2014.01) | |
| *C09D 11/54* | (2014.01) | |
| *C09D 11/40* | (2014.01) | |
| *C08F 290/06* | (2006.01) | |
| *C09D 11/033* | (2014.01) | |
| *C09D 11/107* | (2014.01) | |
| *C09D 11/322* | (2014.01) | |
| *C09D 11/38* | (2014.01) | |

(52) U.S. Cl.
CPC ........ *C09D 11/101* (2013.01); *C08F 290/067* (2013.01); *C09D 11/033* (2013.01); *C09D 11/102* (2013.01); *C09D 11/107* (2013.01); *C09D 11/30* (2013.01); *C09D 11/322* (2013.01); *C09D 11/38* (2013.01); *C09D 11/40* (2013.01); *C09D 11/54* (2013.01)

(58) Field of Classification Search
CPC ..... C09D 11/101; C09D 11/38; C09D 11/107; C09D 11/322; C09D 11/54; C09D 11/033; C09D 11/30; C09D 11/102; C08F 290/067
USPC ............................................... 528/44; 520/1
See application file for complete search history.

(56) References Cited

U.S. PATENT DOCUMENTS

| | | |
|---|---|---|
| 4,339,566 A | 7/1982 | Rosenkranz et al. |
| 5,512,651 A | 4/1996 | Carlson et al. |
| 5,548,005 A | 8/1996 | Kurth et al. |
| 6,538,046 B1 | 3/2003 | Paulus |
| 6,849,679 B2 | 2/2005 | Auschra et al. |
| 6,949,135 B2 | 9/2005 | Ishibashi et al. |
| 7,056,972 B2 | 6/2006 | Nakazawa et al. |
| 7,151,153 B2 | 12/2006 | Bruchmann et al. |
| 7,541,406 B2 | 6/2009 | Banning et al. |
| 7,625,959 B2 | 12/2009 | Daems et al. |
| 8,567,935 B2 | 10/2013 | Andre et al. |
| 8,590,999 B2 | 11/2013 | Irita et al. |
| 8,708,475 B2 | 4/2014 | Hasegawa et al. |
| 8,770,737 B2 | 7/2014 | Wu |
| 8,807,699 B2 | 8/2014 | Ooishi et al. |
| 8,815,980 B2 | 8/2014 | Nakamura et al. |
| 2004/0198868 A1 | 10/2004 | Tielemans et al. |
| 2004/0242763 A1 | 12/2004 | Tielemans et al. |
| 2006/0258773 A1 | 11/2006 | Schmid et al. |
| 2008/0145563 A1 | 6/2008 | Heischkel et al. |
| 2009/0018254 A1 | 1/2009 | Huster et al. |
| 2009/0136680 A1 | 5/2009 | Kishi et al. |
| 2009/0270581 A1 | 10/2009 | Tielemans et al. |
| 2011/0017085 A1 | 1/2011 | Seecharan et al. |
| 2011/0303113 A1 | 12/2011 | Sarkisian et al. |
| 2012/0092428 A1 | 4/2012 | Ganapathiappan et al. |

(Continued)

FOREIGN PATENT DOCUMENTS

| | | |
|---|---|---|
| JP | H07138515 | 5/1995 |
| WO | WO-0234808 | 5/2002 |

(Continued)

OTHER PUBLICATIONS

International Search Report and Written Opinion for International Application No. PCT/US2015/013682 dated Aug. 17, 2015, 11 pages.
"CARBOWAX™MethoxypoJyethylene Glycol (MPEG) 550", Technical datasheet, Dec. 2011, 2 pages.
Poly( ethylene glycol-ran-propylene glycol) monobutyl ether:, (commercial web-page, Sigma-Aldrich) internet 2018, 3 pages.

(Continued)

*Primary Examiner* — Jessica Whiteley
(74) *Attorney, Agent, or Firm* — Dierker & Kavanaugh PC

(57) ABSTRACT

An example of a radiation curable binder dispersion includes water and a radiation curable binder dispersed therein. The radiation curable polyurethane is formed from a polyisocyanate; an acrylate or methacrylate having at least two hydroxyl functional groups and having an acrylate functional group or a methacrylate functional group; another acrylate or methacrylate having one hydroxyl functional group or one amino functional group; and one of i) a homopolymer or copolymer of poly(ethylene glycol) having one or two hydroxyl functional groups or one or two amino functional groups at one end of its chain; or ii) a combination of i and a compound including a carboxylic functional group.

21 Claims, No Drawings

(56) References Cited

U.S. PATENT DOCUMENTS

| | | |
|---|---|---|
| 2012/0207935 A1 | 8/2012 | Shukla |
| 2013/0085217 A1 | 4/2013 | Iu et al. |
| 2013/0303682 A1 | 11/2013 | Konda et al. |
| 2013/0305958 A1 | 11/2013 | Birecki et al. |
| 2014/0220322 A1 | 8/2014 | Wu et al. |
| 2014/0285568 A1 | 9/2014 | Loccufier et al. |
| 2015/0247043 A1* | 9/2015 | Berger ............... C08G 18/6625 427/504 |
| 2016/0304734 A1* | 10/2016 | Feng ................... B41M 5/0017 |

FOREIGN PATENT DOCUMENTS

| | | | |
|---|---|---|---|
| WO | WO2009/115489 | 9/2009 | |
| WO | WO-2014076073 A1 * | 5/2014 | ......... C08G 18/6625 |
| WO | WO2015/116028 | 8/2015 | |
| WO | WO2016/068983 | 5/2016 | |

OTHER PUBLICATIONS

"Polyethyelene glycol", vol. 10, 1995, 24 pages.
Fiume, Monice M., et al., "Safety Assessment of Alkyl PEG-PPG Ethers as Used in Cosmetics", Cosmetic Ingredient Review, Feb. 11, 2013, 30 pages.

\* cited by examiner

RADIATION CURABLE BINDER DISPERSION

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

DETAILED DESCRIPTION

In inkjet printing, polyurethane dispersions may be added to inkjet inks to improve the durability of the resulting print. In particular, radiation curable polyurethanes have been added to improve the scratch and abrasion resistance of the resulting prints. However, it has been found that the amount and type of polyurethane used in the inkjet inks may lead to complications with the jetting performance and reliability (e.g., nozzle health). In addition, the presence of polyurethane can deleteriously affect the image quality (e.g., gloss and optical density). For example, polyurethane may undesirably coagulate when applied to a pre-treatment fixing fluid as a result of a reaction between the polyurethane and component(s) in the pre-treatment fixing fluid.

Examples of the inkjet ink disclosed herein, which include the radiation curable polyurethane binder dispersion disclosed herein, exhibit several desirable characteristics, one of which is improved image quality. The radiation curable polyurethane binder dispersion incorporates a water soluble homopolymer or copolymer of poly(ethylene glycol) at the chain end of the polyurethane. With the addition of this poly(ethylene glycol) component, the gloss and optical density of the resulting printed image are improved, when compared to inks including other types of polyurethane dispersions without this poly(ethylene glycol) component. In some examples, improved image quality results when the inkjet ink (including the radiation curable binder dispersion) is coupled with a pre-treatment fixer fluid.

In addition, the inkjet ink disclosed herein may exhibit improved decap performance. The term "decap performance," as referred to herein, means the ability of the inkjet ink to readily eject from the printhead, upon prolonged exposure to air. The decap time is measured as the amount of time that a printhead may be left uncapped (i.e., exposed to air) before the printer nozzles no longer fire properly, potentially because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. Another decap metric is the number of spits required to get the pen healthy at a specific time interval. A decreased decap time can lead to poor print reliability. As such, the longest decap time that would give acceptable first drop quality or the fewest number of spits required at any given decap time would be desirable for any given ink.

Improved decap performance may be due, at least in part, to the relatively small size of the polyurethane binder. For example, the polyurethane binder may be in the form of particles having an average diameter ranging from about 20 nm to about 200 nm. These small particles can be easily jetted, and thus do not deleteriously affect the nozzle health.

Other properties of the radiation curable polyurethane binder dispersion include the double bond density (i.e., milliequivalents ($10^{-3}$ equivalent) of double bonds per 1 gram of dry polymer) and the acid number (e.g., the sum of both weak and strong acid groups, with a unit of mg KOH per 1 gram of polymer). These properties may contribute to the inkjet ink having dispersion stability, faster curing speed, and the ability to form durable prints.

The radiation curable inkjet ink, which includes the radiation curable polyurethane binder disclosed herein, may be included in a single cartridge ink set or a multiple-cartridge ink set (which may or may not include the pre-treatment fixer fluid). In the multiple-cartridge ink set, any number of the multiple inks may have the radiation curable polyurethane binder incorporated therein. As used herein, the terms "ink(s)" and "ink composition" refer to the radiation curable, inkjet ink.

In an example, the inkjet ink disclosed herein includes a co-solvent (in addition to any water that is present), a colorant, a surfactant, a photoinitiator, the radiation curable polyurethane binder, and a balance of water (which is the main solvent). In some examples, the inkjet ink composition consists of these components, with no other components. As one example, the inkjet ink may exclude polymers other than the radiation curable polyurethane binder disclosed herein.

As used herein, "ink vehicle" may refer to the liquid fluid in which the radiation curable polyurethane binder (e.g., the radiation curable polyurethane binder dispersion) and the colorant (e.g., a colorant dispersion) are placed to form the ink(s). A wide variety of ink vehicles may be used in the inkjet ink. The ink vehicle may include water alone or in combination with a mixture of a variety of additional components. Examples of these additional components may include the co-solvent(s), the surfactant(s), anti-kogation agent(s), and the photoinitiator(s).

The co-solvent(s) may be present in the inkjet ink in an amount ranging from about 0.1 wt % to about 30 wt %, depending, at least in part, on the jetting architecture to be used. In an example, the co-solvent is present in the inkjet ink in an amount of about 10 wt % based on the total wt % of the inkjet ink. It is to be understood that other amounts outside of this example and range may also be used. Classes of co-solvents that may be used include organic co-solvents, such as aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of poly-ethylene glycol alkyl ethers, N-alkyl caprolactams, unsubstituted caprolactams, both substituted and unsubstituted formamides, both substituted and unsubstituted acetamides, and the like. In some examples, the ink vehicle may include 1-(2-hydroxyethyl)-2-pyrrolidone.

As mentioned above, the ink vehicle of the inkjet ink may also include surfactant(s). As an example, the inkjet ink may include non-ionic, cationic, and/or anionic surfactants, which may be present in an amount ranging from about 0.01 wt % to about 5 wt % based on the total wt % of the inkjet ink. In at least some examples, the ink vehicle may include a silicone-free alkoxylated alcohol surfactant such as, for example, TECO® Wet 510 (Evonik Tego Chemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylated acetylenic diol), SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

The ink vehicle of the inkjet ink may include the anti-kogation agent. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS® O3A or CRODAFOS® N-3 acid from Croda Int.) or dextran 500 k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the inkjet ink in an amount ranging from about 0.05 wt % to about 2 wt % of the total wt % of the ink.

The inkjet ink may also include a photoinitiator. The photoinitiator initiates the polymerization and/or crosslinking of the radiation curable polyurethane upon exposure to a suitable stimulus (e.g., electromagnetic radiation). Some examples of the photoinitiator include 1-[4-(2-Hydroxyethoxy)-phenyl]-2-hydroxy-2-methyl-1-propane-1-one (which is commercially available from BASF Corp. as IRGACURE® 2959); acyl phosphine oxide photoinitiators (e.g., IRGACURE® 819, commercially available from BASF Corp.); alpha hydroxy ketone photoinitiators (e.g., IRGACURE® 184, commercially available from BASF Corp.); Iodonium, (4-methylphenyl)[4-(2-methylpropyl)phenyl]-,hexafluorophosphate(1-) (which is commercially available from BASF Corp. as IRGACURE® 250); a high-molecular-weight sulfonium salt (e.g., IRGACURE® 270, commercially available from BASF Corp.); 2-Benzyl-2-dimethylamino-1-(4-morpholinophenyl)-butanone-1 (which is commercially available from BASF Corp. as IRGACURE® 369); alpha amino ketone photoinitiator (e.g., IRGACURE® 379, commercially available from BASF Corp.); a liquid blend of alpha hydroxy ketone/benzophenone photoinitiator (e.g., IRGACURE® 500, commercially available from BASF Corp.); and a liquid photoinitiator blend of acyl phosphine oxide/alpha hydroxy ketone (e.g., IRGACURE® 2022, commercially available from BASF Corp.). Some other suitable photoinitiators include phosphine oxide derivatives, thioxanthone derivatives, and benzophenone derivatives. The photoinitiator is present in the inkjet ink in an amount ranging from about 0.1 wt % to about 1.0 wt % of the total wt % of the ink. In another example, the photoinitiator is present in the in the inkjet ink in an amount ranging from about 0.2 wt % to about 0.6 wt. % of the total wt % of the ink.

In some examples disclosed herein, the ink vehicle of the inkjet ink may also include antimicrobial agent(s) (biocide(s)), viscosity modifier(s), material(s) for pH adjustment, sequestering agent(s), preservative(s), jettability additive(s) (e.g., liponic ethylene glycol (LEG-1), available from Liponics), and the like.

When a biocide is utilized, a suitable amount of the biocide may range from about 0.05 wt % to about 0.5 wt % of a total wt % of the ink. In examples, the biocide is present at about 0.18 wt %, or at about 0.14 wt % of a total wt % of the ink. It is to be understood that the upper limit for the biocide(s) may depend upon the type of biocide and its toxicological effect and/or regulatory requirements. For example, the upper limit for PROXEL® GXL (Arch Chemicals, Inc., Norwalk, Conn.) is 0.2 wt %. Suitable biocides include, for example, PROXEL® GXL, KORDEK® MLX (The Dow Chemical Co.), and/or BIOBAN® CS-1246 (The Dow Chemical Co.).

The inkjet ink may be any color, such as black, cyan, magenta, yellow, etc. As such, in addition to the ink vehicle, the inkjet ink also includes a colorant. In an example, the colorant is a self-dispersed pigment added to the ink vehicle. In another example, the colorant is a pigment in a dispersion including water, the pigment, and a polymer that disperses the pigment (i.e., the polymer dispersant). In an example, the pigment dispersion may also include, for example, a co-solvent, such as 2-pyrrolidone. The pigment dispersion may be prepared or purchased, and the other components of the ink (e.g., vehicle components and the radiation curable polyurethane binder dispersion) may be slowly added to the pigment dispersion with continuous mixing, to form the inkjet ink.

As used herein, "pigment" may generally include organic or inorganic pigment colorants, magnetic particles, aluminas, silicas, and/or other ceramics, organo-metallics, metallic particulates, or other opaque particles that introduce color to the ink vehicle. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof. Any suitable pigment may be used, and while several examples are provided herein, it is to be understood that the list is non-limiting.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® E, MOGUL® L, AND ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® RO100, STANDART® RO200, and DORADO® gold-bronze pigments (available from Eckart Effect Pigments, Wesel, Germany).

The total amount of pigment in the inkjet ink ranges from about 1 wt % to about 5 wt % (based on the total wt % of the inkjet ink). The average particle size of the pigments may range anywhere from about 50 nm to about 200 nm. In an example, the average particle size ranges from about 80 nm to about 150 nm.

In the examples disclosed herein, the pigment may be dispersed by an anionic polymer (i.e., anionic polymeric dispersant). The dispersant may be present in an amount ranging from about 0.1 wt % to about 5 wt % of a total wt % of the ink composition.

In an example, the dispersant may be styrene-acrylic-type dispersants such as acrylic dispersants having i) hydrophilic monomers including acidic monomers, and ii) hydrophobic monomers. The acid number of the dispersant may range from about 120 mg/g to about 300 mg/g. It is to be understood that the styrene-acrylic-type dispersants are water soluble.

Acidic monomers that may be used in the acrylic dispersant may include, for example, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof.

Examples of the hydrophobic monomers that can be polymerized in the acrylic dispersant may include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, and combinations thereof.

The inkjet ink also includes the radiation curable polyurethane binder. In an example, the radiation curable polyurethane binder is present in the radiation curable polyurethane binder dispersion with water. The radiation curable polyurethane/radiation curable polyurethane binder is present in the ink an amount ranging from about 2.5 wt % to about 20 wt % based upon the total wt % of the inkjet ink. In another example, the amount of radiation curable polyurethane/radiation curable polyurethane binder ranges from about 5 wt % to about 10 wt % or from about 5 wt % to about 15 wt % based upon the total wt % of the inkjet ink. This weight percentage accounts for the weight percent of active polyurethane/polyurethane binder present in the ink composition, and does not account for the total weight percent of the radiation curable polyurethane binder dispersion in the inkjet ink. As such, the weight percentages given for the radiation curable polyurethane/radiation curable polyurethane binder do not account for any other components (e.g., water) that may be present when the polyurethane is part of the dispersion. The radiation curable polyurethane binder dispersion may be added with the colorant (e.g., colorant dispersion) and the components of the ink vehicle to form the inkjet ink.

The radiation curable polyurethane binder dispersion may be formed by synthesizing a polyurethane solution (i.e., the polyurethane polymer in an organic solvent), and then ionizing and dispersing the polyurethane solution in water to form the radiation curable polyurethane binder dispersion. The resulting radiation curable polyurethane binder dispersion includes the polyurethane polymer, which is water soluble/dispersible. Each of these steps will be discussed further below.

The radiation curable polyurethane binder is formed from the following components: (a) a polyisocyanate, in some instances (b) a polyol having at least two hydroxyl functional groups, (c) an acrylate or methacrylate with at least two hydroxyl functional groups and having an acrylate functional group or a methacrylate functional group, in some instances (d) a compound including an ionic group or a group capable of forming an ionic group, (e) another acrylate or methacrylate having a hydroxyl functional group or an amino functional group, and (f) a homopolymer or copolymer of poly(ethylene glycol) having one or two hydroxyl functional groups or one or two amino functional group at one end of its chain. It is to be understood that since component (c) include hydroxyl groups and/or component (d) may include hydroxyl groups, these component(s) may participate in the formation of the urethane linkage, and thus component (b) may not be used in some examples.

In the examples disclosed herein, the polyurethane may be formed form components (a), (c), (e), and any of i) component (f) or ii) a combination of components (d) and (f). Component (b) may also be used in any of the previously listed examples.

The components are selected so that the resulting radiation curable polyurethane binder has a double bond density ranging from about 1.0 meq/g to about 6.0 meq/g, and an acid number ranging from about 5 mg/g to about 25 mg/g. In other examples, the double bond density ranges from about 3.0 meq/g to about 5.5 meq/g, and/or the acid number ranges from about 10 mg/g to about 20 mg/g. The combination of these particular components and properties may improve the decap performance and print reliability of the inkjet ink.

For component (a), any suitable polyisocyanate may be used. For example, a polyisocyanate having an average of two or more isocyanate groups may be used. In an example, the polyisocyanate may be an aliphatic, cycloaliphatic, araliphatic, or aromatic polyisocyanate, as well as products of their oligomers, used alone or in mixtures of two or more. In an example, the polyisocyanate is an aliphatic polyisocyanate or a cycloaliphtic polyisocyanate, either of which has a reduced tendency to yellow. Some example polyisocyanates include hexamethylene-1,6-diisocyanate (HDI), 1,12-dodecane diisocyanate, 2,2,4-trimethyl-hexamethylene-diisocyanate (TDMI), 2,4,4-trimethyl-hexamethylene diisocyanate, 2-methyl-1,5-pentamethylene diisocyanate, isophorone diisocyanate (IPDI), and combinations thereof. The amount of the polyisocyanate within the radiation curable binder dispersion ranges from about 20 wt % to about 50 wt % of the total wt % of the radiation curable polyurethane. In an example, polyisocyanate makes up from about 30 wt % to about 50 wt % of the polyurethane binder.

Turning to component (b), the amount of component (b) (i.e., the polyol) within the radiation curable polyurethane binder dispersion ranges from 0 wt % to about 30 wt % of the total wt % of the radiation curable polyurethane. In an example, component (b) (i.e., the polyol) makes up from about 10 wt % to about 25 wt % of the polyurethane binder.

Component (b) is a polyol. The term "polyol", as used herein, means any polymer having at least 2 hydroxyl groups, where the hydroxyl groups are located at each end of the polymer. Some examples of suitable polyols for component (b) may be part of a first class of polyols. As examples, the first class of polyols has a number average molecular weight ranging from greater than 500 to about 6,000, or in some instances, to about 5,000. In any of these examples, component (b) is a macro-glycol. Examples of suitable polyols of the first class include polyester polyols, polyether polyols, polycarbonate polyols, poly(ethyleneoxide) polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols, hydrogenated polybutadiene polyols, polyisobutylene polyols, polyacrylate polyols, halogenated polyesters and polyethers, or mixtures thereof. In an example, the polyol is poly(propylene glycol), poly(tetrahydrofuran), poly(ethyleneoxide) (i.e., poly(ethylene glycol), a polycarbonate polyol, or a polyester polyol.

Other examples of suitable polyols for component (b) may be part of a second class of polyols. The second class has a number average molecular weight that is 500 or lower (e.g., from about 50 to 500). Examples of suitable polyols of the second class include 1,2-propanediol, 1,3-propanediol, 1,2-butanediol, 1,3-butanediol, 1,4-butanediol, 1,5-pentanediol, 3-methylpentane-1,5-diol, 1,6-hexanediol, neopentylglycol, cyclohexane-1,4-dimethanol, 1,2-cyclohexanediol, 1,4-cyclohexanediol, 2-ethyl-3-propylpentanediol, 2,4-dimethylpentanediol, 2-ethyl-2-butylpropanediol, diethyleneglycol, triethyleneglycol, tetraethyleneglycol, dipropyleneglycol, tripropyleneglycol, N-substituted ethanolamines, and mixtures thereof. In an example, the polyol is selected from 1,4-butanediol, 1,5-pentanediol, 3-methylpentane-1,5-diol, 1,6-hexanediol, neopentylglycol, cyclohexane-1,4-dimethanol, trimethylolpropane, glycerol, and pentaerythritol.

It is to be understood that a combination of any of the listed polyols may be used.

The radiation curable polyurethane binder dispersion further includes component (c). Component (c) includes an acrylate or methacrylate with at least two hydroxyl functional groups and an acrylate functional group or a methacrylate functional group. In this example, component (c) is present in an amount ranging from 10 wt % to about 40 wt % based on the total wt % of the radiation curable polyurethane. In another example, component (c) may be present in an amount ranging from about 20 wt % to about 40 wt % based on the total wt % of the radiation curable polyurethane.

Component (c) renders the polyurethane curable via ultraviolet light or some other suitable electromagnetic radiation. In addition, component (c) increases the double bond density and improves the curing efficiency.

Some examples of the acrylate or methacrylate with at least two hydroxyl functional groups include those obtained from the reaction of diglycidyl compounds with (meth) acrylic acid. Aliphatic diglycidyl compounds derived from alpha, omega diols having 4 to 12 carbon atoms or from polyoxyalkylenediols (such as polyethylene glycol, polypropylene glycol, or mixtures thereof that contain oxyalkylene group(s)) may be used. Some specific examples include 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, hydrogenated bisphenol A diglycidyl ether (BGDA or BADGE), hydrogenated bisphenol F diglycidyl ether, and their ethoxylated and/or propoxylated equivalents. An additional example is 1,6-hexanediylbis[oxy(2-hydroxy-3,1-propanediyl)] bisacrylate. Some commercially available examples include MIRAMER® PE-210 (bisphenol A epoxy acrylate) and MIRAMER® PE-230 (aliphatic alkyl epoxy acrylate) (both of which are available from Miwon Chemical).

In further examples, component (c) includes aromatic diglycidyl compounds derived from bisphenol A and bisphenol F. Specifically, bisphenol A diglycidyl ether, bisphenol F diglycidyl ether, and their ethoxylated and/or propoxylated equivalents may be used. Diglycidyl esters may also be used, such as diglycidyl phthalate, N,N-diglycidyl aniline, or N,N-diglycidyl-4-glycidyloxyaniline. Some specific examples include a diacrylate ester of bisphenol A diglycidyl ether (BGDA) and a dimethacrylate ester of bisphenol A diglycidyl ether (BGDM).

Generally, component (d) is a compound including an ionic group or a group that is capable of forming an ionic group. In the examples disclosed herein, component (d) is a compound including a carboxylic functional group. The amount of component (d) within the radiation curable binder dispersion ranges from 0 wt % to about 10 wt % based upon the total wt % of the radiation curable polyurethane. In an example, component (d) makes up from about 2 wt % to about 8 wt % of the polyurethane binder.

The presence of component (d) assists in the ability of the polyurethane to be dissolved or dispersed in water after ionization with a base. In an example, component (d) includes the carboxylic functional group, along with one or more hydroxyl groups or one or more amino groups. Examples of component (d) may be derived from hydroxycarboxylic acids having the general formula $(HO)_xQ(COOH)_y$, where Q is a straight or branched hydrocarbon radical containing 1 to 12 carbon atoms, and x and y each independently range from 1 to 3. Examples of suitable hydroxy-carboxylic acids include dimethylol propionic acid (DMPA), dimethylol butanoic acid (DMBA), alanine, citric acid, tartaric acid, glycolic acid, lactic acid, malic acid, dihydroxymaleic acid, dihydroxytartaric acid, or mixtures thereof.

In some examples, component (d) (which include the carboxylic functional group) is used in combination with another compound including other (i.e., not carboxylic) ionic group(s). For example, hydroxyls or amines containing a sulfonate functional group can also be used in combination with component (d). Examples include taurine and aminoethylaminopropylsulfonate (EPS). Hydroxyls or amines containing a phosphate functional group can also be used in combination with component (d). An example includes glycerol phosphate disodium dehydrate.

Turning now to component (e), component (e) is an acrylate or methacrylate having one hydroxyl functional group or one amino functional group. Similar to component (c), component (e) also renders the polyurethane curable via ultraviolet light or some other suitable electromagnetic radiation.

The amount of component (e) in the radiation curable polyurethane binder dispersion ranges from greater than 10 wt % to about 65 wt % based upon the total wt % of the radiation curable polyurethane. In an example, component (e) makes up from about 20 wt % to about 50 wt % of the polyurethane binder. Within the final polyurethane, component (e) forms an end acrylate.

Some examples of component (e) include the esterification products of aliphatic and/or aromatic polyols with acrylic acid or methacrylic acid. These products have a residual OH functionality of about 1. Some of these products also have at least two acrylic functionalities. Examples of component (e) include the partial esterification products of acrylic acid and/or methacrylic acid with tri-, tetra-, penta- or hexahydric polyols or mixtures thereof. These modified or unmodified polyols are partly esterified with acrylic acid, methacrylic acid or mixtures thereof until the desired residual hydroxyl functionality is reached. Suitable examples include acrylic or the methacrylic esters with linear and branched polyols in which the at least one hydroxyl functionality remains free, such as hydroxyalkylacrylates or hydroxyalkylmethacrylates having 1 to 20 carbon atoms in the alkyl group. Some specific examples include hydroxyethylacrylate (HEA), hydroxyethylmethacrylate (HEMA), hydroxybutylacrylate (HBA), hydroxybutylmethacrylate (HBMA), (3-(acryloxy)-2-hydroxypropyl methacrylate) (AHPMA), glycerol diacrylate, trimethylolpropane diacrylate, pentaerythritoltriacrylate (PETA), ditrimethylolpropane triacrylate (DTPTA), dipentaerythritol pentaacrylate (DPPA), and (poly)ethoxylated and/or (poly)propoxylated equivalents of glycerol diacrylate, trimethylolpropane diacrylate, PETA, DTPTA, or DPPA.

With respect to component (f), component (f) is a homopolymer or copolymer of poly(ethylene glycol) (i.e., poly(ethylene oxide)) having one or two hydroxyl functional groups or one or two amino functional groups. In some examples, the two hydroxyl or amino functional groups are positioned at one end of the poly(ethylene glycol) backbone chain. In an example, the homopolymer or copolymer of poly(ethylene glycol) has a number average molecular weight ($M_n$) ranging from about 500 to about 5,000. In another example, the homopolymer or copolymer of poly (ethylene glycol) has a number average molecular weight ($M_n$) ranging from about 500 to about 3,000. Component (f)

also has a water solubility of greater than 30% v/v (volume of poly(ethylene glycol) to volume of water).

The radiation curable polyurethane dispersion disclosed herein including component (f) increases the gloss and optical density of a printed image on coated media when compared to the gloss and optical density of a printed image on the same coated media formed with an ink that includes other types of polyurethane dispersions, which do not include component (f). This may be due, in part, because component (f) prevents the polyurethane binder from reacting with an underlying pre-treatment fixing fluid, which would otherwise cause the polyurethane binder to undesirably coagulate when the ink composition is applied to the medium. As such, component (f) renders the polyurethane binder insensitive to the pre-treatment fixing fluid, and thus prevents undesirable polyurethane coagulation. Since the polyurethane binder does not precipitate strongly interact with the pre-treatment fixing fluid to cause coagulation, the polyurethane can form a film when printed, which advantageously affects the gloss and optical density of the printed image.

The amount of component (f) in the radiation curable polyurethane binder dispersion ranges from about 5 wt % to about 20 wt % based upon the total wt % of the radiation curable polyurethane. In an example, component (f) is from about 5 wt % to about 15 wt % of the polyurethane binder.

Any copolymer of poly(ethylene glycol) with one or two hydroxyl or amino groups may be used, as long as the copolymer has water solubility of >30% v/v and a suitable number average molecular weight. Some examples of suitable copolymers for component (f) include a copolymer of poly(ethylene) and poly(ethylene glycol) with one hydroxyl functional group (e.g.,

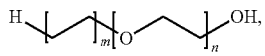

where m=1-10 and n=5-50, a copolymer of poly(propylene glycol) and poly(ethylene glycol) with one hydroxyl functional group, and a copolymer of poly(ethylene glycol) and poly(propylene glycol) with one amino functional group. Some commercially available examples of the copolymer of poly(ethylene glycol) and poly(propylene glycol) with one amino functional group include JEFFAMINE® M-1000 (i.e.,

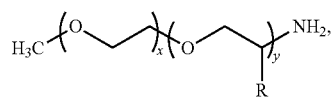

where x=19 and y=3) and JEFFAMINE® M-2070 (i.e.,

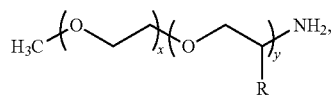

where x=31 and y=10) (both produced by Huntsman Chemicals).

Some additional examples of component (f) include a poly(ethylene glycol) homopolymer, such as monoamine terminated poly(ethylene glycol) (i.e.,

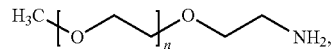

where n=5-100) and a poly(ethylene glycol) mono alkyl ether. Examples of the poly(ethylene glycol) mono alkyl ether include an alkyl group with C1 to C8 straight or branched hydrocarbons, such as methyl, ethyl, and butyl groups. Examples of the poly(ethylene glycol) mono alkyl ether include poly(ethylene glycol) monomethyl ether (i.e.,

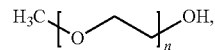

where n=5-100), poly(ethylene glycol) monoethyl ether, poly(ethylene glycol) monopropyl ether, and poly(ethylene glycol) monobutyl ether.

Furthermore, any homopolymer of poly(ethylene glycol) with two hydroxyl or amino groups at one end of the polymer chain may alternatively be used as component (f), as long as the homopolymer has water solubility of >30% v/v and a suitable number average molecular weight. As an example, the homopolymer may be two hydroxyl terminated poly(ethylene glycol), where both hydroxyls are at one end of the chain. An example of a commercially available two hydroxyl terminated poly(ethylene glycol) is YMER™ N120 (a linear difunctional polyethylene glycol monomethyl ether from Perstorp).

In an example of the first step of the method for making the radiation curable polyurethane binder dispersion, components (a), in some instances (b), (c), and in some instances (d) are mixed in a reactor with the organic solvent (e.g., methyl ethyl ketone (MEK), tetrahydrofuran (THF), ethyl acetate, acetone, or combinations thereof) and a catalyst (e.g., dibutyl tin dilaurate, bismuth octanoate, or 1,4-diazabicyclo[2.2.2]octane). The reactor may be maintained at a constant temperature and under a dry air mixture. The components may be mixed and the polymerization reaction may be allowed to occur until the % NCO reaches the theoretical value. In an example, the reaction time ranges from about 2 hours to about 4 hours. In another example, the polymerization reaction occurs for about 2 hours at 70° C. to achieve the theoretical value of the % NCO.

In an example of the second step of the method for making the polyurethane polymer, components (e) and (f) are then added to the polymerization reaction of components (a), in some instances (b), (c), and in some instances (d), and polymerization is continued until the % NCO reaches the theoretical value. In this step, the polymerization reaction may be allowed to occur for a time ranging from about 2 hours to about 4 hours. In an example, the polymerization reaction occurs for about 3 hours at 70° C. to achieve the theoretical value of the % NCO.

In an example of the third step of the method for making the polyurethane polymer, the polyurethane solution may be added to water including a base slowly with vigorous agitation or vice versa.

When another compound including other (i.e., not carboxylic) ionic group(s) is used, the method may further include a fourth step. In the following example, a hydroxyl or an amine containing a sulfonate functional group (e.g., taurine or EPS) is included. In this example, the sulfonate-containing compound is dissolved in one equivalent of a base and a sufficient amount of deionized water to fully dissolve the sulfonate-containing compound. Some examples of the base include ammonia, trimethylamine, triethylamine, sodium hydroxide, potassium hydroxide, and lithium hydroxide. The polymer solution made from components (a), in some instances (b), (c), in some instances other examples of component (d), (e), and (f) is cooled to a temperature ranging from about 30° C. to about 50° C. The aqueous solution of the sulfonate-containing compound is added to the polymer solution with vigorous mixing at a temperature ranging from about 30° C. to about 50° C. for at least 30 minutes.

The mixture may be stirred and organic solvent may be removed by distillation to form the polyurethane binder dispersion.

Once the radiation curable polyurethane binder dispersion is prepared, the radius of the radiation curable polyurethane binder in the dispersion ranges from about 20 nm to about 200 nm. In an example, the radius of the radiation curable polyurethane binder ranges from about 20 nm to about 100 nm. The double bond density the radiation curable polyurethane binder ranges from about 1.0 meq/g to about 6.0 meq/g. In an example, the double bond density ranges from greater than 3.0 meq/g to about 5.5 meq/g.

As mentioned above, the radiation curable polyurethane binder dispersion may be added with the colorant (e.g., colorant dispersion) and the other components of the ink vehicle to form the inkjet ink. After the ink is prepared, the ink(s) may be applied to a medium using any inkjet printer (e.g., thermal, piezoelectric, etc.). In an example, the ink(s) may be applied to a coated offset medium. A coated offset medium is any paper coated to impart better image quality by providing some degree of surface gloss, smoothness, and reduced ink absorbency. Examples of commercially available coated offset media include STERLING® Ultra Gloss (NewPage Corp.) and UTOPIA® (Appleton Coated LLC). In other examples, the medium may be coated or uncoated paper. The medium may also be a vinyl or plastic material.

The ink may then be exposed to curing. Any suitable source of UV radiation may be used to initiate curing, such as, for example, UV lamps, LED (light emitting diode) lamps, LEP (light emitting plasma) plasma torches, or lasers operating in the UV range. Electron beam curing may also be used. The actual wavelength (within the UV range of 280 nm to 400 nm) and intensity of the ultraviolet radiation used may vary, depending at least in part, upon the curable polymer components (e.g., the polyurethane binder) included in the ink. Once the ink is cured, a film forms on the medium.

The radiation curable inkjet ink may be paired with a pre-treatment fixing fluid in an inkjet ink set. In some instances, the pre-treatment fixing fluid may be applied to the medium prior to printing the inkjet ink onto the medium. The pre-treatment fixing fluid is described in greater detail below.

The pre-treatment fixing fluid may be suitable for wet-on-wet printing on the coated offset media. The pre-treatment fixing fluid includes a particular combination of salts (at a low content), a particular co-solvent, and a low HLB (hydrophilic-lipophilic balance) surfactant that is capable of dynamically lowering the surface tension of the pre-treatment fluid. In the examples disclosed herein, the HLB is less than 10. The selected salt(s), solvent, and surfactant together may advantageously promote dot gain and reduce feathering and pigment flotation, resulting in higher quality text prints. The composition of the pre-treatment fixing fluid disclosed herein also exhibits desirable pen reliability.

As mentioned above, the pre-treatment fixing fluid disclosed herein includes calcium propionate, calcium pantothenate, tetraethylene glycol, a low HLB surfactant, an acid, and a balance of water. In some examples, the pre-treatment fixing fluid consists of these components alone, and in other examples, the pre-treatment fixing fluid includes these components and an anti-microbial agent.

The combination of calcium propionate and calcium pantothenate provides the pre-treatment fixing fluid with metal salts that may flocculate the pigment or colorant in the ink deposited thereon, and that may control pigment migration/flotation etc. The calcium propionate may be present in an amount ranging from greater than 4.5 wt % to about 8.0 wt % based on the total wt % of the pre-treatment fluid. The calcium pantothenate may be present in an amount ranging from about 2.0 wt % to 15 wt % or less. In an example, the pre-treatment fixing fluid may include about 6.5 wt % of calcium propionate and about 4.8 wt % of calcium pantothenate. The amount of the metal salts is believed to be high enough to achieve the desired fixing effect without deleteriously affecting pen reliability.

The pre-treatment fixing fluid also includes tetraethylene glycol as a co-solvent. The tetraethylene glycol may be present in total in the pre-treatment fixing fluid in a range from about 0.1 wt % to about 30 wt %. The amount used may depend, at least in part, on the jetting architecture used to apply the pre-treatment fixing fluid. In an example, the amount of tetraethylene glycol used is about 12 wt %.

The pre-treatment fixing fluid also includes the low HLB surfactant. This type of surfactant is capable of dynamically controlling, in particular, lowering, the surface tension of the pre-treatment fixing fluid. The low HLB surfactant may provide the pre-treatment fluid, at the time of its application, with a surface tension that is lower than the surface energy of the coated offset medium upon which the pre-treatment fixing fluid is being applied. As such, the contact angle between the pre-treatment fixing fluid and the medium is zero (0), which enables the pre-treatment fixing fluid to spread out across the medium surface in a horizontal direction (with respect to the medium surface), and effectively wet and reduce the surface energy of the offset coated medium.

One example of the low HLB surfactant is a self-emulsifiable wetting agent based on acetylenic diol chemistry (e.g., SURFYNOL® SE-F surfactant from Air Products and Chemicals, Inc.). Another example is a non-ionic, alkylphenylethoxylate and solvent free surfactant (e.g., CARBOWET® GA-211 surfactant, a.k.a. SURFYNOL® CT-211, from Air Products and Chemicals, Inc.). The low HLB surfactant is present in the pre-treatment fixing fluid in an amount ranging from about 0.01 wt % to about 1.0 wt % based on the total wt % of the pre-treatment fixing fluid. In an example, the amount of the surfactant is about 0.05 wt %. It is believed that the desired surface tension may not be obtainable with other amounts and/or other surfactants.

In some examples, the pre-treatment fixing fluid may also include an antimicrobial agent. Antimicrobial agent(s), such as biocides and fungicides, may be added to inhibit the growth of harmful microorganisms. Example antimicrobial agents may include the NUOSEPT® (Ashland Inc.), UCARCIDE® or KORDEK® (Dow Chemical Co.), and PROXEL® (Arch Chemicals) series, and combinations thereof. A total amount of the antimicrobial agents in the pre-treatment fixing fluid may range from about 0.05 wt % to about 1 wt %. In an example, the pre-treatment fixing fluid includes about 0.1 wt % of a biocide.

The balance of the pre-treatment fixing fluid is water. In addition, buffer(s) may be used to adjust the pH of the pre-treatment fixing fluid to a particular pH. One example of a suitable buffer is methanesulfonic acid. In some examples, the buffer may be used in an amount sufficient to buffer the pH of the pre-treatment fixing fluid so that it ranges from 4.0 to 7.0. In an example, the pH of the pre-treatment fixing fluid is adjusted to about 6.6 using methanesulfonic acid.

As described above, the surface tension of the pre-treatment fixing fluid is lower than the surface energy of the offset coated medium so that when the pre-treatment fixing fluid is applied on the surface of the offset coated medium, the contact angle between the pre-treatment fixing fluid and the offset coated medium is 0. In an example, the surface tension of the pre-treatment fixing fluid is below 37 dyne/cm. In another example, the surface tension of the pre-treatment fixing fluid ranges from about 30 dyne/cm to about 33 dyne/cm. In still another example, the surface energy of the coated offset medium ranges from about 34 dyne/cm to about 42 dyne/cm, and the surface tension of the pre-treatment fixing fluid is about 33 dyne/cm or lower.

The pre-treatment fixing fluid may be applied onto the medium using any suitable high speed (e.g., from about 50 fpm to about 1000 fpm) inkjet printing apparatus, including thermal inkjet printers or web presses, piezoelectric inkjet printers or web presses, continuous inkjet printers or web presses.

In an example, the amount of pre-treatment fixing fluid that is applied to the medium ranges from about 1 gsm to about 7 gsm.

In the examples disclosed herein, no drying operation is performed after the pre-treatment fixing fluid is applied on the medium. Rather, while the pre-treatment fixing fluid is wet, the inkjet ink disclosed herein is deposited on the pre-treatment fixing fluid on the medium. When multiple ink colors are used, it is to be understood that all of the inks are applied while previously deposited layers are still wet. The ink(s) is also formulated to be deposited by the inkjet printing system.

The salts present in the pre-treatment fixing fluid instantaneously react with the colorant present in the ink, causing the pigment to crash out of ink and fixing the pigment on the medium surface. In addition, the applied pre-treatment fixing fluid provides the coated offset medium with a reduced surface energy, which causes the deposited ink(s) to spread less than if the surface energy were higher. This contributes to bleed control and dot gain, and thus enhances the print quality attributes. This benefit is in addition to the benefits obtained from the instantaneous fixing of the colorant(s) in the ink by the salts in the pre-treatment fixing fluid.

To further illustrate the present disclosure, examples are given herein. It is to be understood that these examples are provided for illustrative purposes and are not to be construed as limiting the scope of the present disclosure.

EXAMPLES

Example 1

Several examples of the radiation curable polyurethane binder dispersion disclosed herein and a comparative polyurethane dispersion example were prepared. The compositions are shown in Table 1, with the wt % of each component that was used. Several properties of the resulting polyurethane binder dispersions are also provided in Table 1.

One of the example radiation curable polyurethane binders, referred to herein as PUD-465, was synthesized as follows:

(Part 1) 21.98 g of BGDA, 5.826 g DMPA, 0.11 g of monomethyl ether of Hydroquinone (MEHQ), 35072 g of HDI, and 25 ml of acetone were mixed in a 500 ml 4-neck round bottom flask. A mechanical stirrer (with glass rod and a TEFLON® blade) and a condenser were attached. The flask was immersed in a constant temperature bath at 70° C. The reactor system was maintained under dry oxygen blanket. 5 drops of dibutyl dilaurate (DBTDL) were added to initiate the polymerization. Polymerization was continued for 2 hours at 70° C. until the % NCO reached the theoretical value.

(Part 2) 69.1 g PETA, 17.374 g of M-2070 (JEFFAMINE® M-2070 from Huntsman Chemical), 0.35 g of MEHQ, and 27 g of acetone were mixed in a beaker and added to the reactor system over 30 seconds. 10 g of acetone was used to rinse off the residual monomers on the beaker and was added to the reactor system. The polymerization was continued for 3 hours at 70° C.

(Part 3) The water bath temperature was reduced to 50° C. for 15 minutes. 4.395 g of triethanolamine (TEA) was added to the prepolymer and mixed for 10 minutes. The prepolymer solution was added to 318 g of deionized water over 5 minutes with enough agitation to form a polyurethane dispersion (PUD). The agitation was continued for 15 minutes.

(Part 4) 4.5 g EPS (50% solution) was added to the PUD and stirring was accomplished for 2 hours. The PUD was filtered through 400 mesh stainless sieve. Acetone was removed with a Rotovap at 55° C. The final PUD was filtered through fiber glass filter paper.

The average particle radius of the polyurethane in PUD-465 was measured by Malvern Zetasizer and was 26 nm (radius). The pH was 8.1. The % Solid was 30.3%.

Each of the other example and the comparative example polyurethane dispersions were prepared in a similar manner to PUD-465, using the components and weight percentages set forth in Table 1.

The following abbreviations are used in Table 1: AN (acid number), DB (double bond density meq/g), N-120 (YMER N-120, Polyethyleneoxide Diol from Perstop Chemical), PTMG 1K (Poly(tetramethylene ether)glycol with a molecular weight of 1000), PTMG 2K (Poly(tetramethylene ether) glycol with a molecular weight of 2000), BGDA (Bisphenol A diglycidylether), DMPA (dimethylol propionic acid), EPS (aminoethylaminopropylsulfonate), PETA (Pentaerythritoltriacrylate), AHPMA (3-(acryloxy)-2-hydroxypropyl methacrylate), HBA (hydroxybutylacrylate), M-1000 (JEFFAMINE® M-1000 from Hunstman Chemical), and M-2070 (JEFFAMINE® M-2070 from Huntsman Chemical).

TABLE 1

| Component | | | (b) | | | | Other Ionic | | (f) | | | |
|---|---|---|---|---|---|---|---|---|---|---|---|---|
| PUD- | | (a) | N- | | | (c) | acid and (d) | | (e) | | M- | M- |
| ID | AN | DB | HDI | 120 | PTMG1K | PTMG2K | BGDA | EPS | DMPA | PETA | AHPMA | HBA | 2070 | 1000 |
| 460 | 9.3 | 4 | 20.4 | 0 | 23.2 | 0 | 5.34 | 0 | 2.2 | 37.8 | 0 | 0 | 0 | 11 |
| 462 | 9.2 | 4.2 | 20.1 | 0 | 22.8 | 0 | 5.3 | 0 | 2.2 | 38.8 | 0 | 0 | 10.9 | 0 |

TABLE 1-continued

| Component | | | (b) | | | | Other Ionic | | | (f) | | |
|---|---|---|---|---|---|---|---|---|---|---|---|---|
| PUD- | | (a) | N- | | | (c) | acid and (d) | | (e) | | M- | M- |
| ID | AN | DB | HDI | 120 | PTMG1K | PTMG2K | BGDA | EPS | DMPA | PETA | AHPMA | HBA | 2070 | 1000 |
| 463 | 14.9 | 4.5 | 21.8 | 0 | 15.9 | 0 | 5.7 | 0 | 3.6 | 42.3 | 0 | 0 | 10.6 | 0 |
| 464 | 9.2 | 4.2 | 20.3 | 0 | 23 | 0 | 5.3 | 0 | 2.2 | 39.3 | 0 | 0 | 9.9 | 0 |
| 465 | 16.2 | 5.2 | 23.8 | 0 | 0 | 0 | 14.7 | 1.5 | 3.9 | 46.1 | 0 | 0 | 11.6 | 0 |
| 467 | 14.1 | 4.6 | 23.1 | 1.7 | 0 | 9.1 | 8.3 | 1.5 | 3.4 | 37.8 | 0 | 6.3 | 10.3 | 0 |
| 468 | 10.4 | 5.6 | 22.9 | 0 | 0 | 0 | 14.4 | 1.5 | 2.5 | 49.8 | 0 | 0 | 10.5 | 0 |
| 468-2 | 10.4 | 5.6 | 22.9 | 0 | 0 | 0 | 14.4 | 0 | 2.5 | 49.8 | 0 | 0 | 10.5 | 0 |
| 470 | 17.1 | 5.6 | 25 | 0 | 0 | 0 | 15.4 | 1.5 | 4.1 | 49.4 | 0 | 0 | 6.1 | 0 |
| 442-1* | 16.9 | 4.7 | 27.6 | 2.1 | 0 | 10.9 | 9.9 | 0 | 4.0 | 0 | 45.4 | 0 | 0 | 0 |

*Comparative Radiation Curable Polyurethane Binder

Example 2

In this example, example and comparative ink compositions were prepared with a cyan pigment (present in a dispersion with water) and the example and comparative radiation curable polyurethane binder dispersions listed in Table 1 of Example 1. The general formulation of the example and comparative ink compositions is shown in Table 2. However, it is to be understood that each ink included a different one of the radiation curable polyurethane binder dispersions listed in Table 1. The example and comparative inks were prepared by adding the respective radiation curable binder dispersion and the cyan pigment dispersion to the remaining ink components shown in Table 2.

TABLE 2

| Ingredient | Specific component | wt % active |
|---|---|---|
| PUD | Radiation curable polyurethane binder dispersion of TABLE 1 | 5.00 |
| Co-solvent | 1-(2-hydroxyethyl)-2-pyrrolidone | 10.00 |
| Anti-Kogation agent | CRODAFOS ® N3A | 0.75 |
| Surfactant | SURYNOL ® SE-F (80%) | 0.40 |
| Surfactant | TEGO ® WET 510 | 0.40 |
| Additive | LEG-1 | 1.00 |
| Photoinitiator | IRGACURE ® 2959 | 0.50 |
| Colorant | Cyan pigment | 2.50 |
| Water | | Balance |

A pre-treatment fixer fluid was also prepared. The composition of the pre-treatment fixing fluid is shown below in Table 3.

TABLE 3

| Compositional Components | wt % |
|---|---|
| Calcium Propionate | 6.5 |
| Calcium Pantothenate | 4.8 |
| Tetraethylene Glycol | 12 |
| SURFYNOL ® SE-F | 0.05 |
| Biocide | 0.2 |
| Methanesulfonic acid | Used to Adjust pH to 6.6 |
| Water | Balance |

The pre-treatment fixing fluid was printed onto STERLING® Ultra Gloss (NewPage Corp.) media in an amount of about 2.5 gsm (g/m²). Each example and comparative ink composition was then printed onto the media containing the pre-treatment fixing fluid in an amount of about 10 gsm. The prints were dried and exposed to UV light.

The optical density (OD) and 60° gloss measurements were taken of the printed images. The optical density (OD) was measured using an X-rite EXact™ densitometer and 60° gloss measurements were taken using a BYK-Gardner MICRO-GLOSS® 60° Meter (BYK-Gardner USA). The results of the optical density (OD) and 60° gloss measurements are shown below in Table 4. Table 4 lists each of the inks and the polyurethane dispersion within that ink.

TABLE 4

| Ink ID | PUD-ID | 60° gloss | Cyan OD |
|---|---|---|---|
| Ink 1 | 460 | 16.55 | 1.48 |
| Ink 2 | 462 | 18.38 | 1.50 |
| Ink 3 | 463 | 19.53 | 1.63 |
| Ink 4 | 464 | 17.74 | 1.57 |
| Ink 5 | 465 | 21.87 | 1.72 |
| Ink 6 | 467 | 15.31 | 1.49 |
| Ink 7 | 468 | 17.54 | 1.64 |
| Ink 8 | 468-2 | 18.02 | 1.62 |
| Ink 9 | 470 | 17.24 | 1.59 |
| Comparative Ink 1 | 442-1* | 9.83 | 1.33 |

*Comparative Radiation Curable Polyurethane Binder

As shown in Table 4, the ink compositions including the example radiation curable polyurethane dispersions disclosed herein (inks 1-9) all have an increased optical density and 60° gloss when compared to the ink composition with the comparative radiation curable polyurethane dispersion (comparative ink 1). These results indicate that the addition of component f (i.e., the homopolymer or copolymer of poly(ethylene glycol) having one hydroxyl functional group or one amino functional group) improves the image quality of the print that is formed with the example inks. Component (f) may be interacting with the pre-treatment fixing fluid component(s) in a manner that significantly improves the image quality, when compared to prints formed with the comparative ink composition without component (f).

Example 3

In this example, examples and comparative examples of the radiation curable polyurethane dispersions were prepared using the same method described in reference to Example 1. Some properties of the polyurethane dispersions as well as the base used in part 3 of the method are shown in Table 5A. The formulations of the example and comparative example radiation curable polyurethane dispersions for this example are shown below in Table 5B.

Any of the abbreviations from Table 1 used in Table 5B are the same, and in addition, the following abbreviations are used in Table 5B: IPDI (isophorone diisocyanate), MCR-C61 (Monocarbinol terminated polydimethylsiloxane), and BGDM (a dimethacrylate ester of bisphenol A diglycidyl ether).

TABLE 5A (Properties and Base)

| | PUD Properties | | Base Used During |
|---|---|---|---|
| PUD ID | AN | DB | formulation of PUD |
| 465B | 16.2 | 5.2 | TEA |
| 465-N | 16.2 | 5.2 | NaOH |
| 465-K | 16.2 | 5.2 | KOH |
| 555 | 15.7 | 4.9 | TEA |
| 477* | 16.9 | 4.7 | NaOH |
| 442-2* | 16.9 | 4.7 | NaOH |
| 75* | 15.1 | 3.0 | TEA |

TABLE 5B (wt % of PU Components)

| | (a) | | (b) | | | | (c) | | (d) and Other Ionic Acid | | (e) | | (f) | |
|---|---|---|---|---|---|---|---|---|---|---|---|---|---|---|
| PUD ID | HDI | IPDI | PTMG1K | MCR-C61 | PTMG2K | N-120 | BGDA | BGDM | DMPA | EPS | PETA | AHPMA | M-2070 | M-1000 |
| 465B | 23.8 | 0 | 0 | 0 | 0 | 0 | 14.7 | 0 | 3.9 | 1.5 | 46.1 | 0 | 11.6 | 0 |
| 465-N | 23.8 | 0 | 0 | 0 | 0 | 0 | 14.7 | 0 | 3.9 | 1.5 | 46.1 | 0 | 11.6 | 0 |
| 465-K | 23.8 | 0 | 0 | 0 | 0 | 0 | 14.7 | 0 | 3.9 | 1.5 | 46.1 | 0 | 11.6 | 0 |
| 555 | 23.0 | 0 | 0 | 6.2 | 0 | 0 | 11.2 | 0 | 3.8 | 1.5 | 44.6 | 0 | 11.2 | 0 |
| 477* | 27.6 | 0 | 0 | 0 | 10.9 | 2.1 | 9.9 | 0 | 4.0 | 1.5 | 0 | 45.4 | 0 | 0 |
| 442-2* | 27.6 | 0 | 0 | 0 | 10.9 | 2.1 | 9.9 | 0 | 4.0 | 0 | 0 | 45.4 | 0 | 0 |
| 75* | 0 | 32.4 | 20.0 | 0 | 0 | 3.0 | 0 | 15.3 | 0 | 0 | 0 | 25.7 | 3.6 | 0 |

*Comparative Radiation Curable Polyurethane Binder

In this example, example and comparative ink compositions were prepared with a black pigment (present in a dispersion with water) and the example and comparative radiation curable polyurethane binder dispersions listed in Table 5. The general formulation of the example and comparative ink compositions for Example 3 is shown in Table 6. However, it is to be understood that each ink included a different one of the radiation curable polyurethane binder dispersions listed in Table 5. The example and comparative inks were prepared by adding the respective radiation curable binder dispersion and the cyan pigment dispersion to the remaining ink components shown in Table 6.

TABLE 6

| Ingredient | Specific component | wt % active |
|---|---|---|
| PUD | Radiation curable polyurethane binder dispersion of TABLE 5 | 5.00 |
| Co-solvent | 1-(2-hydroxyethyl)-2-pyrrolidone | 10.00 |
| Anti-Kogation agent | CRODAFOS ® N3A | 0.5 |
| Surfactant | SURYNOL ® CT-211 | 0.8 |
| Sensitizer | ethoxylated thioxanthone | 0.25 |
| Additive | LEG-1 | 1.00 |
| Photoinitiator | Dispersion of IRGACURE ® 819 | 0.25 |
| Colorant | Cyan pigment | 2.75 |
| Water | | Balance |

A pre-treatment fixer fluid was also used in this example. The pre-treatment fixer fluid had the same formulation as disclosed in Example 2, Table 3.

The pre-treatment fixing fluid was printed onto STERLING® Ultra Gloss (NewPage Corp.) media in an amount of about 2.5 gsm. Each ink composition was then printed, onto the media containing the pre-treatment fixing fluid, in an amount of about 6.8 gsm. The prints were dried and exposed to UV light.

The optical density (OD) and 75° gloss measurements were taken of the printed images. The optical density (OD) was measured using an X-rite EXact™ densitometer and 75° gloss measurements were taken using a BYK-Gardner MICRO-GLOSS® 75° Meter (BYK-Gardner USA). The results of the optical density (OD) and 75° gloss measurements are shown below in Table 7.

TABLE 7

| Ink ID | PUD-ID | OD | 75° gloss |
|---|---|---|---|
| Ink 10 | 465B | 1.26 | 78.5 |
| Ink 11 | 465-N | 1.33 | 80.0 |
| Ink 12 | 465-K | 1.37 | 79.2 |
| Ink 13 | 555 | 1.25 | 72.4 |
| Comparative Ink 2 | 477* | 1.05 | 68.2 |
| Comparative Ink 3 | 442-2* | 1.07 | 68.8 |
| Comparative Ink 4 | 75* | 1.00 | 65.7 |

*Comparative Radiation Curable Polyurethane Binder

As shown in Table 7, the printed images formed from the ink compositions including the example radiation curable polyurethane dispersions disclosed herein (i.e., inks 10-13) all have increased optical density and 75° gloss measurements when compared to the printed images formed from the ink compositions using the comparative radiation curable polyurethane dispersions (i.e., comparative inks 2-4). The additional homopolymer or copolymer of poly(ethylene glycol) having one or two hydroxyl functional groups or one or two amino functional groups (i.e., component f) improves the image quality of the print that is formed with the example inks. Component (f) may be interacting with the pre-treatment fixing fluid component(s) in a manner that significantly improves the image quality, when compared to prints formed with the comparative ink compositions without component (f).

It is to be understood that the ranges provided herein include the stated range and any value or sub-range within the stated range. For example, a range from about 5 wt % to about 20 wt % should be interpreted to include not only the explicitly recited limits of about 5 wt % to about 20 wt %, but also to include individual values, such as 6.5 wt %, 10 wt %, 12.5 wt %, 15 wt %, etc., and sub-ranges, such as from about 12 wt % to about 18 wt %, from about 5 wt % to about 7 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A radiation curable binder dispersion, comprising:
water; and
a radiation curable polyurethane dispersed in the water, the radiation curable polyurethane having been formed from:
  a polyisocyanate;
  an acrylate or methacrylate, the acrylate or methacrylate having at least two hydroxyl functional groups and having an acrylate functional group or a methacrylate functional group;
  an other acrylate or methacrylate, the other acrylate or methacrylate having one hydroxyl functional group or one amino functional group; and one of:
  i) a homopolymer or copolymer of poly(ethylene glycol) having one or two hydroxyl functional groups or one or two amino functional groups at one end of its chain; or
  ii) a combination of i and a compound including a carboxylic functional group.

2. The radiation curable binder dispersion as defined in claim 1 wherein the homopolymer or copolymer of poly (ethylene glycol) has a number average molecular weight ranging from about 500 and about 5,000 and a water solubility greater than 30% v/v.

3. The radiation curable binder dispersion as defined in claim 1 wherein the homopolymer or copolymer of poly (ethylene glycol) is:
  a poly(ethylene glycol) copolymer selected from the group consisting of a copolymer of poly(ethylene) and poly(ethylene glycol) with the one hydroxyl functional group, a copolymer of poly(propylene glycol) and poly(ethylene glycol) with the one hydroxyl functional group, and a copolymer of poly(ethylene glycol) and poly(propylene glycol) with the one amino functional group; or
  a poly(ethylene glycol) homopolymer selected from the group consisting of monoamine terminated poly(ethylene glycol), poly(ethylene glycol) monomethyl ether, poly(ethylene glycol) monoethyl ether, poly(ethylene glycol) monopropyl ether, poly(ethylene glycol) monobutyl ether, and two hydroxyl terminated at one end poly(ethylene glycol).

4. The radiation curable binder dispersion as defined in claim 1 wherein the radiation curable polyurethane is further formed from ii, and wherein the compound including the carboxylic functional group is selected from the group consisting of dimethylol propionic acid (DMPA), dimethylol butanoic acid (DMBA), alanine, citric acid, tartaric acid, glycolic acid, lactic acid, malic acid, dihydroxymaleic acid, dihydroxytartaric acid, and mixtures thereof.

5. The radiation curable binder dispersion as defined in claim 1 wherein:
the polyisocyanate is present in an amount ranging from about 20 wt % to about 50 wt % based on a total wt % of the radiation curable polyurethane;
the acrylate or methacrylate having the at least two hydroxyl functional groups and having the acrylate functional group or the methacrylate functional group is present in an amount ranging from 10 wt % to about 40 wt % based on the total wt % of the radiation curable polyurethane;
the other acrylate or methacrylate having the one hydroxyl functional group or the one amino functional group is present in an amount ranging from about 10 wt % to about 65 wt % based on the total wt % of the radiation curable polyurethane;
the homopolymer or copolymer of poly(ethylene glycol) is present in an amount ranging from greater than 5 wt % to about 20 wt % based on the total wt % of the radiation curable polyurethane; and when included:
the compound including the carboxylic functional group is present in an amount ranging from greater than 0 wt % to about 10 wt % based on the total wt % of the radiation curable polyurethane.

6. The radiation curable binder dispersion as defined in claim 5 wherein the radiation curable polyurethane is further formed from a polyol having at least two hydroxyl functional groups, wherein the polyol is present in an amount ranging from about 10 wt % to about 30 wt % based on a total wt % of the radiation curable polyurethane.

7. The radiation curable binder dispersion as defined in claim 1 wherein the radiation curable polyurethane has a double bond density ranging from about 1 to about 6, and an acid number ranging from about 5 mg/g and about 25 mg/g.

8. The radiation curable binder dispersion as defined in claim 1 wherein the radiation curable polyurethane is further formed from a polyol having at least two hydroxyl functional groups.

9. A radiation curable inkjet ink, comprising:
water;
a colorant;
a co-solvent;
a surfactant;
a photoinitiator; and
a radiation curable polyurethane binder, the radiation curable polyurethane binder having been formed from:
  a polyisocyanate;
  an acrylate or methacrylate, the acrylate or methacrylate having at least two hydroxyl functional groups and having an acrylate functional group or a methacrylate functional group;

an other acrylate or methacrylate, the other acrylate or methacrylate having one hydroxyl functional group or one amino functional group; and one of:
i) a homopolymer or copolymer of poly(ethylene glycol) having one or two hydroxyl functional groups or one or two amino functional groups at one end of its chain; or
ii) a combination of i and a compound including a carboxylic functional group.

10. The radiation curable inkjet ink as defined in claim 9 wherein the homopolymer or copolymer of poly(ethylene glycol) has a number average molecular weight ranging from about 500 and about 5,000 and a water solubility greater than 30% v/v.

11. The radiation curable inkjet ink as defined in claim 9 wherein the homopolymer or copolymer of poly(ethylene glycol) is:
a poly(ethylene glycol) copolymer selected from the group consisting of a copolymer of poly(ethylene) and poly(ethylene glycol) with the one hydroxyl functional group, a copolymer of poly(propylene glycol) and poly(ethylene glycol) with the one hydroxyl functional group, and a copolymer of poly(ethylene glycol) and poly(propylene glycol) with the one amino functional group; or
a poly(ethylene glycol) homopolymer selected from the group consisting of monoamine terminated poly(ethylene glycol), poly(ethylene glycol) monomethyl ether, poly(ethylene glycol) monoethyl ether, poly(ethylene glycol) monopropyl ether, poly(ethylene glycol) monobutyl ether, and two hydroxyl terminated at one end poly(ethylene glycol).

12. The radiation curable inkjet ink as defined in claim 9 wherein the radiation curable polyurethane binder is further formed from ii, and wherein the compound including the carboxylic functional group is selected from the group consisting of dimethylol propionic acid (DMPA), dimethylol butanoic acid (DMBA), alanine, citric acid, tartaric acid, glycolic acid, lactic acid, malic acid, dihydroxymaleic acid, dihydroxytartaric acid, and mixtures thereof.

13. The radiation curable inkjet ink as defined in claim 9 wherein the radiation curable polyurethane binder is present in an amount ranging from about 2.5 wt % to about 20 wt % of a total wt % of the inkjet ink.

14. An inkjet ink set, comprising:
a pre-treatment fixing fluid, including:
calcium propionate present in an amount ranging from greater than 4.5 to about 8.0 wt % based on a total wt % of the pre-treatment fixing fluid;
calcium pantothenate present in an amount ranging from about 2.0 wt % to equal to or less than 15 wt % based on the total wt % of the pre-treatment fixing fluid;
tetraethylene glycol;
a surfactant;
an acid present in an amount sufficient to render a pH of the pre-treatment fixing fluid from about 4.0 to about 7.0; and
a balance of water; and
a radiation curable inkjet ink, including:
water;
a colorant;
a co-solvent;
a surfactant;
a photoinitiator; and
a radiation curable polyurethane binder, the radiation curable polyurethane binder having been formed from:
a polyisocyanate;
optionally a polyol having at least two hydroxyl functional groups;
an acrylate or methacrylate, the acrylate or methacrylate having at least two hydroxyl functional groups and having an acrylate functional group or a methacrylate functional group;
an other acrylate or methacrylate, the other acrylate or methacrylate having one hydroxyl functional group or one amino functional group; and one of:
i) a homopolymer or copolymer of poly(ethylene glycol) having one or two hydroxyl functional groups or one or two amino functional groups at one end of its chain; or
ii) a combination of i and a compound including a carboxylic functional group.

15. The inkjet ink set as defined in claim 14 wherein the homopolymer or copolymer of poly(ethylene glycol) is:
a poly(ethylene glycol) copolymer selected from the group consisting of a copolymer of poly(ethylene) and poly(ethylene glycol) with the one hydroxyl functional group, a copolymer of poly(propylene glycol) and poly(ethylene glycol) with the one hydroxyl functional group, and a copolymer of poly(ethylene glycol) and poly(propylene glycol) with the one amino functional group; or
a poly(ethylene glycol) homopolymer selected from the group consisting of monoamine terminated poly(ethylene glycol), poly(ethylene glycol) monomethyl ether, poly(ethylene glycol) monoethyl ether, poly(ethylene glycol) monopropyl ether, poly(ethylene glycol) monobutyl ether, and two hydroxyl terminated at one end poly(ethylene glycol).

16. The radiation curable binder dispersion as defined in claim 1 wherein the homopolymer or copolymer of poly (ethylene glycol) has the one or two amino functional groups at the one end of its chain.

17. The radiation curable binder dispersion as defined in claim 1 wherein the other acrylate or methacrylate has the one amino functional group.

18. The radiation curable binder dispersion as defined in claim 1 wherein the homopolymer or copolymer of poly (ethylene glycol) is a poly(ethylene glycol) copolymer selected from the group consisting of a copolymer of poly (ethylene) and poly(ethylene glycol) with the one hydroxyl functional group, and a copolymer of poly(ethylene glycol) and poly(propylene glycol) with the one amino functional group.

19. The radiation curable binder dispersion as defined in claim 1 wherein the homopolymer or copolymer of poly (ethylene glycol) is a poly(ethylene glycol) homopolymer selected from the group consisting of monoamine terminated poly(ethylene glycol), poly(ethylene glycol) monomethyl ether, poly(ethylene glycol) monoethyl ether, poly(ethylene glycol) monopropyl ether, poly(ethylene glycol) monobutyl ether, and two hydroxyl terminated at one end poly(ethylene glycol).

20. The radiation curable binder dispersion as defined in claim 1 wherein the other acrylate or methacrylate having the one hydroxyl functional group or the one amino functional group is present in an amount ranging from 37.8 wt % to about 65 wt % based on the total wt % of the radiation curable polyurethane.

21. The radiation curable binder dispersion as defined in claim 1 wherein the radiation curable polyurethane incorporates the homopolymer or copolymer of poly(ethylene glycol) at a chain end of the radiation curable polyurethane.

* * * * *